United States Patent [19]

Sasaki et al.

[11] Patent Number: 4,892,900

[45] Date of Patent: Jan. 9, 1990

[54] POLYPHENYLENE ETHER RESIN COMPOSITION

[75] Inventors: Isao Sasaki; Naoki Yamamoto, both of Hiroshima; Akira Yanagase, Otake, all of Japan

[73] Assignee: Mitsubishi Rayon Co., Ltd., Tokyo, Japan

[21] Appl. No.: 250,734

[22] Filed: Sep. 29, 1988

[51] Int. Cl.[4] .................... C08L 51/08; C08K 7/14; C08K 5/52; C08K 3/22

[52] U.S. Cl. .................... 524/141; 524/504; 524/409; 525/63; 525/133

[58] Field of Search .......... 525/63, 133; 524/141, 524/504

[56] References Cited

U.S. PATENT DOCUMENTS

| | | | |
|---|---|---|---|
| 2,891,920 | 6/1959 | Hyde et al. | 260/29.2 |
| 3,294,725 | 12/1966 | Findlay et al. | 260/29.2 |
| 3,890,406 | 6/1975 | Matsunaga et al. | 524/504 |
| 4,226,761 | 10/1980 | Cooper et al. | 525/63 |
| 4,421,883 | 12/1983 | Cooper et al. | 524/504 |
| 4,556,685 | 12/1985 | Sugio et al. | 524/141 |
| 4,775,712 | 10/1988 | Sasaki et al. | 524/504 |

*Primary Examiner*—Lewis T. Jacobs
*Attorney, Agent, or Firm*—Cushman, Darby & Cushman

[57] ABSTRACT

A polyphenylene ether resin composition superior in impact resistance, heat resistance, mechanical strength, moldability, and flow properties, comprising a polyphenylene ether resin (A), a polystyrene resin (B), and a polyorganosiloxane-based graft copolymer (C) produced by graft polymerizing one or more vinyl monomers onto a polyorganosiloxane rubber which contains a graft-linking agent copolymerized and exhibits a degree of swelling of 3 to 15 measured in toluene.

15 Claims, No Drawings

POLYPHENYLENE ETHER RESIN COMPOSITION

BACKGROUND OF THE INVENTION

1. Field of the Invention

The present invention relates to a polyphenylene ether resin composition superior in impact resistance, heat resistance, mechanical strength, moldability, and flow properties, and more particularly, to such a composition composed of a polyphenylene ether resin, a polystyrene resin, and a specific polyorganosiloxane-based graft copolymer.

2. Description of the Prior Art

Applications of polyphenylene ether resins as engineering plastics are expanding since these resins are superior in heat resistance, stiffness, etc. However, the applications are restricted in that these resins are somewhat inferior in impact resistance.

For improving polyphenylene ether resins in impact resistance, methods comprising blending them with polybutadiene elastomers are disclosed in Japanese Patent Publication No. 32731/72, Japanese Patent Application Kokai (Laid-Open) No. 2345/71, and other documents. According to these methods, however, none of practically useful blends superior in heat stability can be obtained, because unsaturated bonds remain in the blended polybutadiene elastomers and this makes the blends thermally instable.

On the other hand, methods for improving polyphenylene ether resins in moldability or processability as well as in impact resistance are disclosed in U.S. Patent No. 3,361,851, Japanese Patent Publication No. 7069/67, etc. These methods comprise blending polyphenylene ether resins with polyolefins such as ethylene-propylene copolymers. According to these methods, however, the low compatibility of polyphenylene ether resins with the polyolefin may cause delamination in molded products of the blend containing 10% by weight or more of the polyolefin. Moreover, the surface appearance of such molded products is inferior and the improvement of impact resistance is not much remarkable.

Further, Japanese Patent Application Kokai No. 75663/74 discloses a polyphenylene ether resin composition improved in moldability or processability while retaining the stiffness and mechanical strength of polyphenylene ether resins. This composition is a product of improving the above polyolefin blending method, that is, a product of blending a polyphenylene ether resin with a polyolefin-based graft copolymer resulting from the graft polymerization of a styrene monomer onto a polyolefin. However, the impact resistance is not sufficiently enhanced according to this method.

SUMMARY OF THE INVENTION

Accordingly, it is an object of the present invention to provide a polyphenylene ether resin composition which is improved in impact resistance without sacrificing the superior heat resistance and mechanical strength inherent in polyphenylene ether resins and is superior in moldability and flow properties.

It is another object of the invention to provide a polyphenylene ether resin composition wherein the components have such good compatibility one with another as not to cause delamination in the molded products of the composition.

Thus, the present invention involves a polyphenylene ether resin composition comprising a polyphenylene ether resin (A), a polystyrene resin (B), and a polyorganosiloxane-based graft copolymer (C) produced by graft-polymerizing one or more vinyl monomers onto a polyorganosiloxane rubber which contains a graft-linking agent copolymerized and exhibits a degree of swelling of 3 to 15 measured in toluene.

DETAILED DESCRIPTION OF THE INVENTION

The present inventors made intensive studies of resin compositions for the purpose of improving polyphenylene ether resins in impact resistance while retaining the superior heat resistance and mechanical strength inherent in these resins. As a result it has been found that a graft copolymer produced by graft-polymerizing a vinyl monomer in a high efficiency onto a polyorganosiloxane rubber, when combined with a polyphenylene ether resin and a polystyrene resin, provides a resin composition, the component resins thereof being good in compatibility one with another, the molded products of the resin composition not delaminating and being improved markedly in impact resistance, and the resin composition being superior in heat resistance, mechanical strength, moldability, and flow properties. Based on this finding, the present invention has been accomplished.

The polyphenylene ether resin (A) to be used in the invention is a homopolymer or copolymer represented by the formula

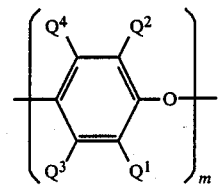

wherein $Q^1$ through $Q^4$ are selected independently of one another from the group consisting of hydrogen and hydrocarbon radicals and m denotes a number of at least 30.

Examples of such polyphenylene ether resins include poly(2,6-dimethyl-1,4-phenylene)ether, poly-(2,6-diethyl-1,4-phenylene)ether, poly(2,6-dipropyl-1,4-phenylene)ether, poly(2-methyl-6-ethyl-1,4-phenylene)ether, poly(2-methyl-6-propyl-1,4-phenylene)ether, poly(2-ethyl-6-propyl-1,4-phenylene)ether, copolymer of (2,6-dimethyl-1,4-phenylene)ether with (2,3,6-trimethyl-1,4-phenylene)ether, copolymer of (2,6-diethyl-1,4-phenylene)ether with (2,3,6-trimethyl-1,4-phenylene)ether, and copolymer of (2,6-dimethyl-1,4-phenylene)ether with (2,3,6-triethyl-1,4-phenylene)ether. Of these polymers, preferred are poly(2,6-dimethyl-1,4-phenylene)ether and a copolymer of (2,6-dimethyl-1,4-phenylene)ether with (2,3,6-trimethyl-1,4-phenylene)ether and particularly preferred is poly(2,6-dimethyl-1,4-phenylene)ether. These polyphenylene ether resins are compatible with polystyrene resins in any mixing ratio. There is no particular restriction on the polymerization degree of the polyphenylene ether resin used in the invention. But it is preferable to use the resin having a reduced viscosity of 0.3 to 0.7 dl/g measured in chloroform at 25° C. The resin having a less reduced viscosity than 0.3 dl/g tends to exhibit low heat stability while the resin having a reduced viscosity exceeding 0.7 dl/g tends to be inferior in moldability. The above defined polyphenylene ether resins may be used alone or in combination.

The polystyrene resin (B) to be used in the invention is a homopolymer constituted of an aromatic vinyl monomer represented by the formula

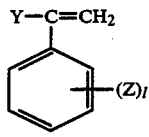

wherein, Y denotes hydrogen or alkyl of 1 to 4 carbon atoms, Z denotes halogen or alkyl of 1 to 4 carbon atoms, and l is a number of 0 or 1 to 3, or is a copolymer constituted of at least 50% by weight of said aromatic vinyl monomer and another vinyl monomer copolymerizable therewith. Examples of such polystyrene resins include polystyrene, polychlorostyrene, poly-α-methylstyrene, styrene-acrylonitrile copolymer, styrene-methyl methacrylate copolymer, styrene-maleic anhydride copolymer, styrene-maleimide copolymer, styrene-N-phenylmaleimide copolymer, and styrene-acrylonitrile-α-methylstyrene terpolymer. In particular, polystyrene is preferable.

The polyorganosiloxane-based graft copolymer (C) to be used in the invention is prepared by graft-polymerizing one or more vinyl monomers onto a polyorganosiloxane rubber containing a copolymerized graft-linking agent, the degree of swelling of said rubber measured in toluene being from 3 to 15. The content of polyorganosiloxane rubber in this graft copolymer is desirably in the range of 5 to 90% by weight. The polyorganosiloxane rubber is constituted of three components: an organosiloxane, graft-linking agent, and crosslinking agent.

Suitable organosiloxanes for constituting the polyorganosiloxane rubber include, for example, hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenylcyclotetrasiloxane, and octaphenylcyclotetrasiloxane. These siloxanes may be used alone or in combination. The content of organosiloxane in the polyorganosiloxane rubber is at least 50%, preferably at least 70%, by weight.

Suitable graft-linking agents for use herein are organosiloxane compounds which can form units represented by any of the formulae $$CH_2=C-COO(CH_2)_p SiR_n^1 O_{(3-n)/2}, \quad (I)$$
$$\quad\ | \\ \quad R^2$$

$$CH_2=CH-SiR_n^1 O_{(3-n)/2}, \quad (II)$$

and $$HS(CH_2)_p SiR_n^1 O_{(3-n)/2}, \quad (III)$$

wherein, R[1] denotes methyl, ethyl, propyl, or phenyl, R[2] denotes hydrogen or methyl, n denotes 0, 1, or 2, and p denotes a number of 1 to 6. (Meth)Acryloyloxysiloxanes that can form units of formula (I) are advantageous in that these graft-linking agents give high graft efficiencies, hence favoring the formation of effective graft chains and providing high impact resistance. Of the graft-linking agents which can form units of formula (I), particularly preferred are methacryloyloxysiloxanes. Examples of suitable methacryloyloxysiloxanes include β-methacryloyloxyethyldimethoxymethylsilane, γ-methacryloyloxypropylmethoxydimethylsilane, γ-methacryloyloxypropyldimethoxymethylsilane, γ-methacryloyloxypropyltrimethoxysilane, γ-methacryloyloxypropylethoxydiethylsilane, γ-methacryloyloxypropyldiethoxymethylsilane, and δ-methacryloyloxybutyldiethoxymethylsilane. The content of graft-linking agent in the polyorganosiloxane rubber is from 0.1 to 20%, preferably from 0.1 to 10%, by weight.

Suitable crosslinking agents for use herein are of the trifunctional or tetrafunctional siloxanes including, for example, trimethoxymethylsilane, triethoxyphenylsilane, tetramethoxysilane, tetraethoxysilane, tetra-n-propoxysilane, and tetrabutoxysilane. The content of crosslinking agent in the polyorganosiloxane rubber is from 0.2 to 30% by weight. This content should be controlled so that the degree of swelling of polyorganosiloxane rubber (the proportion of the weight of toluene absorbed by the polyorganosiloxane rubber to its weight when it is saturated with toluene at 25° C.) may be within the range of 3 to 15. When the degree of swelling is less than 3, that is, when the amount of crosslinking agent is excessive, the polyorganosiloxane does not have rubber elasticity. When the degree of swelling exceeds 15, such polyorganosiloxane rubber particles cannot hold their own shapes in the graft copolymer and hence cannot give impact resistance. The resulting graft copolymer, if blended with the polyphenylene ether resin, will produce effects merely equivalent to those of adding a polyorganosiloxane oil.

The degree of swelling is measured in the following manner: A sample of the polyorganosiloxane rubber latex obtained by polymerization is added to about 3 to 5 times its volume of isopropyl alcohol with stirring to break the emulsion and coagulate the siloxane polymer. The obtained polymer is washed with water and then dried in vacuo at 80° C. for 10 hours. About 1 g of the dry polymer is precisely weighed out, immersed in about 30 g of toluene, and left standing therein at 25° C. for 100 hours to be swelled to equilibrium. Thereafter, the extra toluene is removed by decantation, and the swelled polymer is weighed precisely, then dried in vacuo at 80° C. for 16 hours to evaporate away the absorbed toluene, and weighed again precisely. The degree of swelling is calculated according to the following equation:

$$\text{Degree of swelling} = \frac{\left(\begin{array}{c}\text{Weight of}\\ \text{swelled polymer}\end{array}\right) - \left(\begin{array}{c}\text{Weight of}\\ \text{dry polymer}\end{array}\right)}{(\text{Weight of dry polymer})}$$

The polyorganosiloxane rubber can be produced, for instance, according to the method described in U.S. Pat. Nos. 2,891,920 and 3,294,725. In a preferred embodiment of the present invention, the rubber is produced by shear-mixing a solution of graft-linking agent and crosslinking agent in the organo-siloxane with water in the presence of an emulsifier such as alkylbenzenesulfonic acid or alkylsulfonic acid by using, for example, a homogenizer. Alkylbenzene-sulfonic acid is best suited because it acts not only as an emulsifier for the organosiloxane but also as a polymerization initiator. In this case, the joint use of a metal salt of alkylbenzenesulfonic acid, a metal salt of alkylsulfonic acid or the like is preferable since it is effective in stabilizing the polymer during graft polymerization.

Vinyl monomers which can be graft-polymerized onto the polyorganosiloxane rubber include; aromatic alkenyl compounds, e.g. styrene, α-methylstyrene and vinyltoluene; methacrylates, e.g. methyl methacrylate and 2-ethylhexyl methacrylate; acrylates, e.g. methyl acrylate, ethyl acrylate and butyl acrylate; and vinyl cyanides, e.g. acrylonitrile and methacrylonitrile, and other acrylates and methacrylates. These vinyl monomers may be used alone or in combination. Of these monomers preferred are aromatic alkenyl compounds and methacrylates and particularly preferred are styrene and methyl methacrylate.

The respective contents of the polyorganosiloxane rubber and the polymerized vinyl monomer in the polyorganosiloxane-based graft copolymer are from 5 to 90% by weight and from 95 to 10% by weight based on the weight of the graft copolymer, respectively. When the polyorganosiloxane rubber content is less than 5% by weight, the resulting resin composition will be unsatisfactory in impact resistance. On the contrary, when this content exceeds 90% by weight, such a graft copolymer cannot exhibit the effect of grafting.

The polyorganosiloxane-based graft copolymer can be produced by the ordinary emulsion polymerization method. That is, the graft copolymer can be obtained by neutralizing a polyorganosiloxane rubber latex with alkali, and adding and polymerizing the above-cited vinyl monomer in one or more stages according to radical polymerization techniques.

The resulting latex of polyorganosiloxane-based graft copolymer is poured into a hot aqueous solution of metal salt such as calcium chloride or magnesium sulfate to salt out or coagulate the copolymer, which is then separated and dried.

The thus obtained polyorganosiloxane-based graft copolymer is a mixture of free polymer formed incidentally from the vinyl monomer during graft polymerization and true graft polymer consisting of the polyorganosiloxane rubber and a vinyl polymer combined chemically to the rubber. This proportion of the chemically combined vinyl polymer to the polyorganosiloxane rubber, viz. the percentage of grafting is an important factor for improving the polyphenylene ether resin in impact resistance. Through these graft chains, the polyorganosiloxane rubber can achieve good compatibility with the polyphenylene ether resin and with the polystyrene resin. Accordingly, the percentage of grafting is desirably at least 10%, preferably at least 30%, and styrene or methyl methacrylate is preferably used for the graft polymerization though various vinyl monomers can be used alone or in combination as stated above.

On the other hand, the formation of some free vinyl polymer not combined to the polyorganosiloxane rubber is inevitable during graft polymerization but it is desirable from the viewpoint of the moldability and flow properties to minimize the formation of the free polymer. The amount ratio of the vinyl monomer forming graft linkage (combined chemically to the polyorganosiloxane rubber) to all the vinyl monomer used, viz. the graft efficiency, which depends greatly on the kind of graft-linking agent copolymerized in the polyorganosiloxane rubber, is highest and the moldability and flow properties are hence most improved, when (meth)acryloyloxysiloxanes, particularly methacryloyloxysiloxanes which can form units represented by the above formula (I) are used as graft-linking agents.

The impact resistance of molded products from the resin composition relates intimately to the number average particle size of the polyorganosiloxanebased graft copolymer. This size should be in the range of 0.1 to 0.5 μm. When the average particle size is less than 0.1 μm, the molded products will be inferior in impact resistance. On the other hand, when the average particle size exceeds 0.5 μm, the molded products will be inferior in surface appearance as well as in impact resistance.

In the resin composition of the present invention, the proportions of component (A), i.e. the polyphenylene ether resin, component (B), i.e. the polystyrene resin, and component (C), i.e. the polyorganosiloxane-based graft copolymer, can be varied over wide ranges. It is desirable that the respective proportions of components (A), (B), and (C) be from 20 to 80%, from 19 to 75%, and from 1 to 40%, by weight based on the total polymer weight of the resin composition.

When the proportion of component (A) is less than 20% by weight, the resin composition tends to be insufficient in heat resistance and when this proportion exceeds 80% by weight, the resin composition tends to be worse in flow properties and moldability. When the proportion of component (B) is less than 19% by weight, good balance between the moldability and the heat resistance tends to be difficult to attain and when this proportion exceeds 75% by weight, good balance between the impact resistance and the heat resistance tends to be difficult to attain. When the proportion of component (C) is less than 1% by weight, the impact resistance tends to be insufficient and when this proportion exceeds 40% by weight, the content of the polyorganosiloxane rubber becomes high in consequence and this tends to lower the mechanical strength, making the resin composition unfit for use.

The resin composition of the present invention is superior in heat resistance and impact resistance, particularly low-temperature impact resistance, and also in flow properties. In addition, the heat resistance of the resin composition can be freely designed to change from the level of ultra-heat resistant resins to the level of ordinary heat-resistant resins by varying the proportion of component (A) to component (B). Moreover, the impact resistance is free to design by varying the proportion of component (C).

The resin composition of the present invention can be prepared by mechanical intermixing of components (A), (B), and (C) using a known apparatus such as a mixer, roll mill, or twin-screw extruder, followed by pelletizing.

Further, flame retardance can be imparted to the resin composition comprising components (A), (B), and (C), by blending an effective amount of phosphoric ester flame retarder. Such phosphoric ester flame retarders include, for example, trimethyl phosphate, triethyl phosphate, tripropyl phosphate, tributyl phosphate, tribenzyl phosphate, trihexyl phosphate, triphenyl phosphate, tricresyl phosphate, trixylyl phosphate, tris(chloroethyl) phosphate, tris(chlorophenyl) phosphate, and tris(dibromopropyl) phosphate. In particular, triphenyl phosphate is preferable.

The amount of phosphoric ester flame retarder to be blended depends upon the kind of flame retarder, proportions of components (A), (B), and (C), and other factors. Desirably, this amount is in the range of 0.5 to 35 parts by weight per 100 parts by weight of the resin blend comprising components (A), (B), and (C). Thus, it is desirable that the flame-retardant resin composition be composed of 100 parts by weight of the resin blend comprising 20 to 80% by weight of component (A), 19 to 75% by weight of component (B), and 1 to 40% by weight of component (C) and 0.5 to 35 parts by weight of the flame retarder per 100 parts by weight of the resin blend.

Moreover, the resin composition comprising components (A), (B), and (C) can be reinforced with a reinforcing amount of glass fiber. Desirably, the glass fiber has a diameter of 5 to 50 μm and a filament length of at least 0.2 mm. Suitable surface-treating agents for the glass fiber are aminosilanes, vinylsilanes, epoxysilanes, other silane coupling agents, chromium containing coupling agents, etc. Suitable binding agents for the glass fiber include those of polyester and ethylene-vinyl acetate families.

Glass fiber is used in an amount of 5 to 100 parts, preferably 10 to 70 parts, by weight per 100 parts by weight of the resin blend comprising components (A), (B), and (C). In order to achieve the reinforcing effect, at least 5 parts by weight of glass fiber is necessary. When the amount of glass fiber exceeds 100 parts by weight, the characteristic feature of the present invention is hardly displayed. Thus, it is desirable that the resin composition reinforced with glass fiber be composed of 100 parts by weight of the resin blend comprising 20 to 80% by weight of component (A), 19 to 75% by weight of component (B), and 1 to 40% by weight of component (C) and 5 to 100 parts by weight of glass fiber per 100 parts by weight of the resin blend.

In the present invention, the above-mentioned phosphoric ester flame retarder can also be used jointly with glass fiber. In this case, the flame retarder and the glass fiber are used desirably in amounts of 0.5 to 35 parts and 5 to 100 parts, respectively, by weight per 100 parts by weight of the resin blend comprising components (A), (B), and (C).

Furthermore, the resin composition comprising components (A), (B), and (C) can be reinforced and simultaneously the coefficient of linear expansion of the composition can be decreased to a great extent by blending carbon fiber. Desirably, the carbon fiber has a diameter of 5 to 20 μm and is treated with a surface treating agent of epoxy and nylon families.

Carbon fiber is used in an amount of 5 to 50 parts, preferably 10 to 40 parts, by weight per 100 parts by weight of the resin blend comprising components (A), (B), and (C). In order to achieve the reinforcing effect, at least 5 parts by weight of carbon fiber is necessary. When the amount of carbon fiber exceeds 50 parts by weight, the characteristic feature of the present invention is hardly displayed. For achieving the reinforcing effect and decreasing simultaneously the coefficient of linear expansion to the levels of significance, it is desirable to incorporate carbon fiber in an amount of 5 to 50 parts by weight into 100 parts by weight of the resin blend comprising 20 to 80% by weight of component (A), 19 to 75% by weight of component (B), and 1 to 40% by weight of component (C).

In the present invention, the above-mentioned phosphoric ester flame retarder, the glass fiber and the carbon fiber can be used separately or jointly. In this case, the phosphoric ester flame retarder, the glass fiber and the carbon fiber are used in amounts of from 0.5 to 35 parts, from 5 to 100 parts and from 5 to 50 parts, respectively, by weight per 100 parts by weight of the resin blend comprising components (A), (B), and (C).

If necessary, the resin composition of the present invention may further contain additives selected from stabilizers, plasticizers, lubricants, pigments, fillers, etc. Such additives include; stabilizers, e.g. triphenyl phosphite; lubricants, e.g. polyethylene wax and polypropylene wax; pigments, e.g. titanium oxide, zinc sulfide, and zinc oxide; and fillers, e.g. asbestos, wollastonite, mica, and talc.

The following examples illustrate the present invention in more detail. In the following description, parts are all by weight.

In the following examples and comparative examples, methods used for measuring properties are as follows:

Flexural strength:
   Measured in accordance with ASTM D 790.
Izod impact strength:
   Measured in accordance with ASTM D 256 (¼", notched).
Vicat softening temperature:
   Measured in accordance with ISO R 306.
Melt index:
   Measured according to a method based on ASTM D 1238 (applying a load of 5 kg at 275° C.).
Coefficient of linear expansion:
   Measured according to a method based on ASTM D 696.

REFERENCE EXAMPLE 1

Preparation of polyorganosiloxane-based graft copolymer (S-1):

A mixture of 6 parts of tetraethoxysilane, 2 parts of γ-methacryloyloxypropyldimethoxymethylsilane, and 92 parts of octamethylcyclotetrasiloxane was added to 300 parts of distilled water containing 1 part of sodium dodecylbenzenesulfonate and 1 part of dodecylbenzenesulfonic acid. The mixture was stirred preliminarily in a homo-mixer at 10,000 rpm and then emulsified by passing twice through a homogenizer under a pressure of 300 kg/cm², giving an organosiloxane latex. This latex was poured into a separable flask equipped with a condenser and a stirrer, then was heated with stirring at 80° C. for 5 hours, cooled at 10° C. for 20 hours, and neutralized with aqueous sodium hydroxide to pH 6.9 to end the polymerization, thus yielding a polyorganosiloxane rubber latex. The polymerization yield was 90.8%, the degree of swelling of the rubber 6.8, and the average particule size of the rubber 0.14 μm.

264 Parts of this polyorganosiloxane rubber latex was charged in a separable flask equipped with a stirrer. After replacement of the air with nitrogen, the latex was heated to 80° C., and a mixture of 40 parts of styrene and 0.16 part of t-butyl peroxide was added. The whole mixture was stirred for 30 minute, and further a mixture of 0.2 part of Rongalite, 0.0004 part of ferrous sulfate, 0.0008 part of disodium ethylenediaminetetraacetate, and 5 parts of distilled water was added to initiate the radical polymerization. The temperature of the reaction mixture was maintained at 80° C. for 6 hours and then the mixture was cooled to end the polymerization, thus yielding a graft copolymer latex. The percentage of styrene polymerized was 92%, the percentage of grafting 52%, and the graft efficiency 78%. The obtained latex was added dropwise to 456 parts of hot water containing 1.5 wt % of calcium chloride to coagulate the polymer, which was then separated, washed, and dried at 75° C. for 10 hours, thus yielding a dry powder of graft copolymer (S-1).

REFERENCE EXAMPLE 2

Preparation of polyorganosiloxane-based graft copolymers (S-2) through (S-4):

Dry powders (S-2)-(S-4) of graft copolymers were prepared by carrying out polymerization for polyorganosiloxane rubbers and then graft polymerization according to the procedure of Reference Example 1 except that 2 parts of γ-mercaptopropyldimethoxymethylsilane, 2 parts of tetramethyltetravinylcyclosiloxane, and 2 parts of γ-methacryloyloxypropyltrimethoxysilane were used severally as graft-linking agents in place of γ-methacryloyloxypropyldimethoxymethylsilane. Results of the polymerization and graft polymerization are shown in Table 1.

γ-methacryloyloxypropyldimethoxymethylsilane, a graft-linking agent, was also fixed at 2 parts. Results of the polymerization and graft polymerization are shown in Table 2.

TABLE 2

| Designation of dry power of graft copolymer | Amount of tetraethoxy-silane used (part) | Polymerization for polyorganosiloxane rubber | | | Graft polymerization | | |
|---|---|---|---|---|---|---|---|
| | | Polymerization yield (%) | Degree of swelling of rubber | Average particle size of rubber (μm) | Percentage of grafting | Gragt efficiency (%) | Percentage of styrene polymerized |
| S-5 | 0.1 | 90.8 | 21.5 | 0.14 | 46 | 69 | 92 |
| S-6 | 1 | 90.5 | 12.3 | 0.14 | 49 | 74 | 92 |
| S-7 | 15 | 91 | 4.2 | 0.14 | 45 | 68 | 92 |
| S-8 | 35 | 90.9 | 2.7 | 0.14 | 46 | 69 | 92 |

EXAMPLES 1-6 AND COMPARATIVE EXAMPLES 1-3

Eight different resin compositions (Examples 1-6 and Comparative Examples 1 and 2) were prepared by blending 8.3 wt % each of graft copolymers S-1 through S-8, 44 wt % of poly(2,6-dimethyl-1,4-phenylene)ether having a reduced viscosity (ηsp/C) of 0.59 dl/g (measured in chloroform at 25° C.), and 47.7 wt % of polystyrene having a melt index of 30 g/10 minutes (200° C., 5 Kg load). In addition, a resin composition (Comparative Example 3) was prepared by blending 48 wt % of the above-mentioned poly(2,6-dimethyl-1,4-phenylene)ether and 52 wt % of the above-mentioned polystyrene.

TABLE 1

| Designation of dry powder of graft copolymer | Graft-linking agent | Polymerization for polyorganosiloxane rubber | | | Graft polymerization | | |
|---|---|---|---|---|---|---|---|
| | | Polymerization yield (%) | Degree of swelling of rubber | Average particle size of rubber (μm) | Percentage of grafting | Graft efficiency (%) | Percentage of styrene polymerized |
| S-2 | γ-Mercaptopropyldimethoxy methylsilane | 90.2 | 7.2 | 0.14 | 32 | 48 | 92 |
| S-3 | Tetramethyltetravinylcyclosiloxane | 90.6 | 6.9 | 0.14 | 14 | 21 | 93 |
| S-4 | γ-Methacryloyloxypropylmethoxysilane | 90.8 | 5.7 | 0.14 | 56 | 84 | 92 |

REFERENCE EXAMPLE 3

Preparation of polyorganosiloxane-based graft copolymers (S-5) through (S-8):

Dry powders (S-5)-(S-8) of graft copolymers were prepared by carrying out polymerization for polyorganosiloxane rubbers and then graft polymerization according to the procedure of Reference Example 1 except that tetraethoxysilane, a crosslinking agent, was used in varying amounts as shown in Table 2, while the total amount of tetraethoxysilane and octamethylcyclotetrasiloxane was fixed at 98 parts and the amount of Each of these nine resin compositions was fed into a twin-screw extruder (model ZSK-30, supplied by Werner & Pfleiderer Corp.), melt-mixed at a cylinder temperature of 280° C., and pelletized. After drying, pellets from each resin composition were fed into an injection molding machine (model SJ-35, supplied by Meiki Co., Ltd.), and injection-molded at a cylinder temperature of 280° C. and a mold temperature of 60° C., giving specimens for different tests. Results of evaluating properties of these specimens are shown in Table 3.

TABLE 3

| | Designation of polyorganosiloxane-based graft copolymer used | Flexural strength (Kg/cm²) | Izod impact strength (¼", notched, at 23° C.) (Kg · cm/cm) | Vicat softening temperature (°C.) | Melt index (5 Kg load, 275° C.) (g/10 min.) |
|---|---|---|---|---|---|
| Example 1 | S-1 | 930 | 23 | 138 | 11 |
| Example 2 | S-2 | 920 | 16.8 | 137 | 8.3 |
| Example 3 | S-3 | 890 | 12.4 | 137 | 5.2 |
| Example 4 | S-4 | 920 | 22.3 | 138 | 10.8 |
| Example 5 | S-6 | 900 | 21 | 138 | 9.6 |
| Example 6 | S-7 | 880 | 20.3 | 138 | 10.5 |
| Comparative Example 1 | S-5 | 820 | 5.2 | 137 | 6.3 |
| Comparative Example 2 | S-8 | 900 | 4.8 | 137 | 4.4 |
| Comparative | | | | | |

TABLE 3-continued

| | Designation of polyorgano-siloxane-based graft copolymer used | Flexural strength (Kg/cm²) | Izod impact strength (¼", notched, at 23° C.) (Kg · cm/cm) | Vicat softening temperature (°C.) | Melt index (5 Kg load, 275° C.) (g/10 min.) |
| --- | --- | --- | --- | --- | --- |
| Example 3 | — | 1050 | 3.7 | 138 | 5.1 |

Test results of Example 1 and those of Comparative Example 3 prove that the resin composition of Example 1 has markedly-improved impact resistance and flow properties.

Test results of Examples 1–4 reveal that the compositions of Examples 1 and 4 prepared by using γ-methacryloyloxypropyldimethoxymethylsilane and γ-methacryloyloxypropyltrimethoxysilane, respectively, as graft-linking agents in the polymerization to form the polyorganosiloxane rubbers of the polyorganosiloxane-based graft copolymers used are superior in both Izod impact strength and flow property (melt index) to the compositions of Examples 2 and 3 which are prepared by using γ-mercaptopropyldimethoxymethylsilane and tetramethyl-tetravinylcyclosiloxane, respectively, as graft-linking agents. This is because γ-methacryloyloxypropyldimethoxymethylsilane and γ-methacryloyloxytrimethoxysilane give higher graft efficiencies and hence the resulting polyorganosiloxane-based graft copolymers, when blended with both the polyphenylene ether resin and the polystyrene resin, contribute to the improvement of impact resistance without impairing flow properties of the resin compositions.

Further, test results of Examples 5 and 6 and those of Comparative Examples 1 and 2 prove that graft copolymers based on polyorganosiloxane rubbers, when the degrees of swelling of them are within the range defined according to the present invention, improve effectively the impact resistance.

EXAMPLES 7–14 AND COMPARATIVE EXAMPLES 4–7

Eight different compositions (Examples 7–14) each comprising three components were prepared by blending the polyorganosiloxane-based graft copolymer (S-1) obtained in Reference Example 1, the same poly(2,6-dimethyl-1,4-phenylene)ether and the same polystyrene as used in the preceding examples in proportions varied as shown in Table 4.

In addition, four different compositions (Comparative Examples 4–7) each comprising two components were prepared by blending the same poly(2,6-dimethyl-1,4-phenylene)ether as used in the preceding examples with a high-impact polystyrene containing 8 wt % of polybutadiene and 13.3 wt % of gel, in proportions varied as shown in Table 4.

Pellets and then specimens for tests were prepared from these 12 different compositions by using the twin-screw extruder and injection molding machine mentioned above under the same conditions as in the preceding examples. Results of evaluating properties of these specimens are shown in Table 4.

TABLE 4

| | Component content (wt. %) in resin composition | | | | Rubber content in resin composition | Izod impact strength (¼", notched, at 23° C.) (Kg · cm/cm) | Vicat softening temperature (°C.) | Melt index (5 Kg load, 275° C.) (g/10 min.) |
| --- | --- | --- | --- | --- | --- | --- | --- | --- |
| | Polyorgano-siloxane-based graft copolymer | Poly(2,6-dimethyl-1,4-phenylene) ether | Polystyrene | High-impact polystyrene | | | | |
| Example 7 | 7.3 | 45 | 47.7 | — | 4.4 | 20.5 | 139 | 12.7 |
| Example 8 | 10.8 | 42.8 | 46.4 | — | 6.5 | 25.2 | 138 | 10.6 |
| Example 9 | 12.5 | 42 | 45.5 | — | 7.5 | 29.7 | 138 | 9.8 |
| Example 10 | 16.7 | 40 | 43.3 | — | 10 | 34.5 | 138 | 7.6 |
| Example 11 | 8.3 | 20 | 71.7 | — | 5 | 19.6 | 116 | 28.4 |
| Example 12 | 8.3 | 35 | 56.7 | — | 5 | 21.3 | 126 | 21.5 |
| Example 13 | 5 | 55 | 40 | — | 3 | 25.6 | 155 | 4.3 |
| Example 14 | 5 | 65 | 30 | — | 3 | 32.7 | 167 | 2.5 |
| Comparative Example 4 | — | 20 | — | 80 | 6.4 | 6.2 | 110 | 15.3 |
| Comparative Example 5 | — | 45 | — | 55 | 4.4 | 8.3 | 127 | 6.2 |
| Comparative Example 6 | — | 55 | — | 45 | 3.6 | 13.6 | 151 | 3.3 |
| Comparative Example 7 | — | 65 | — | 35 | 2.8 | 15.2 | 159 | 1.4 |

As is evident from results of Examples 7–14 shown in Table 4, the impact resistance rises as the content of graft copolymer (S-1) is increased. It can also been seen that the heat resistance represented by Vicat softening temperature rises as the content of poly(2,6-dimethyl-1,4-phenylene)ether is increased. Comparing these properties of compositions of Examples 7–14 with those of compositions of Comparative Examples 4–7 containing high-impact polystyrene, that is, contrasting Examples 7, 13, and 14 with Comparative Examples 5, 6, and 7, respectively, it proves that polyphenylene ether resin compositions containing the polyorganosiloxane-based graft copolymer are superior in impact resistance, heat resistance, and flow properties when the rubber content of each composition is nearly equal to that of the opposite composition.

EXAMPLE 15 AND COMPARATIVE EXAMPLE 8

Measurements of low-temperature Izod impact strengths at −30° C. and −60° C. were made on test specimens prepared for Izod impact strength measurement in Example 7 and Comparative Example 5. Table 5 shows results of these measurements together with results of the measurement at 23° C.

TABLE 5

| Test specimen used for impact strength measurement | Izod impact strength (¼", notched) | | |
|---|---|---|---|
| | 23° C. (kg · cm/cm) | −30° C. (kg · cm/cm) | −60° C. (kg · cm/cm) |
| Example 15  Specimens of Example 7 | 20.5 | 16.4 | 13.5 |
| Comparative Example 8  Specimens of Comparative Example 5 | 8.3 | 5.7 | 3.4 |

As is evident from Table 5, the polyphenylene ether resin composition of the present invention is superior also in low-temperature impact strength to the polyphenylene ether composition containing high-impact polystyrene.

EXAMPLE 16 AND COMPARATIVE EXAMPLE 9

Pellets from each of the resin compositions prepared in Example 7 and Comparative Example 5 were allowed to stand in a melt indexer at 275° C. for predetermined periods shown in Table 6, and the melt index of the composition after each exposure to heat was measured toe valuate the heat stability. Results of the evaluation are shown in Table 6.

TABLE 6

| | Pellets used | Retention time in melt indexer | | |
|---|---|---|---|---|
| | | 10 min. | 20 min. | 30 min. |
| | | Melt index (5 Kg load, at 275° C.) (g/10 min.) | | |
| Example 16 | Pellets prepared in Example 7 | 12.7 | 12.2 | 12 |
| Compar. Example 9 | Pellets prepared in Comparative Example 5 | 8.3 | 7.1 | 5 |

As is evident from Table 6, the polyphenylene ether resin composition of the present invention shows little change in melt index when maintained at a high temperature for a long time, thus being superior in heat resistance to the polyphenylene ether resin composition containing high-impact polystyrene.

EXAMPLE 17

264 Parts of the polyorganosiloxane rubber latex obtained in Reference Example 1 was charged in a separable flask equipped with a stirrer, and after replacement of the air with nitrogen, the latex was heated to 65° C. Then a mixture of 30 parts of styrene, 10 parts of acrylonitirle and 0.08 part of t-butyl peroxide was added and the resulting mixture was stirred for 30 minutes. Further, a mixture of 0.1 part of Rongalite, 0.0002 part of ferrous sulfate, 0.0004 part of disodium ethylenediaminetetraacetate, and 5 parts of distilled water was added to initiate the radical polymerization. The temperature of the reaction mixture was maintained at 65° C. for 2 hours and then dropped to end the polymerization, thus yielding a graft copolymer lates. The overall percentage of styrene and acrylonitrile polymerized was 98%, the percentage of grafting 56.7%, the graft efficiency 85%. The obtained latex was added dropwise to 456 parts of hot water containing 2 wt % of magnesium sulfate to coagulate the polymer, which was then separated, washed, and dried at 75° C. for 10 hours, thus yielding a dry powder of graft copolymer (S-9).

In the next place, a resin composition was prepared by blending 8.3 wt % of the dry powder of graft copolymer (S-9), 44.0 wt % of the same poly(2,6-dimethyl-1,4-phenylene)ether as used in Examples 1–6, and 47.7 wt % of the same polystyrene as used in Examples 1–6. Pellets and then specimens for different tests were formed from this resin composition by operating the above-said twin-screw extruder and injection molding machine under the same conditions as in Examples 1–6, and properties of these specimens were evaluated. Results thereof are shown in Table 7.

TABLE 7

| | Designation of graft copolymer used | Izod impact strength (¼", notched, at 23° C.) (Kg · cm/cm) | Vicat softening temperature (°C.) | Melt index (5 Kg load, at 275° C.) (g/10 min.) |
|---|---|---|---|---|
| Example 17 | S-9 | 19.6 | 137 | 9.6 |

As is evident from Table 7, a polyphenylene ether resin composition superior in heat resistance, impact resistance, and flow property can also be obtained with a styrene-acrylonitrile mixture is used for the graft resin component of the polyorganosiloxane-based graft copolymer.

EXAMPLES 18–20

Three different resin compositions were prepared by blending 8.3 wt % of the polyorganosiloxanebased graft copolymer (S-1) (obtained in Reference Example 1), 47.7 wt % of the same polystyrene as used in Examples 1–6, and 44.0 wt % each of poly(2,6-dimethyl-1,4-phenylene)ethers having different $\eta sp/C$ values (measured in chloroform at 25° C.) as shown in Table 8. Pellets and test specimens were formed from each resin composition by operating the above-said twin-screw extruder and injection molding machine under the same conditions as in Examples 1–6, and properties of these specimens were evaluated. Results thereof are shown in Table 8.

TABLE 8

| | $\eta sp/C$ of poly(2,6-dimethyl-1,4-phenylene) ether (dl/g) | Izod impact strength (¼",notched, at 23° C.) (kg · cm/cm) | Vicat softening temperature (°C.) | Melt index (5 Kg load, at 275° C.) (g/10 min.) |
|---|---|---|---|---|
| Example 18 | 0.45 | 19.2 | 135 | 16.3 |
| Example 19 | 0.52 | 22 | 136 | 13.7 |
| Example 20 | 0.68 | 23.6 | 139 | 8.6 |

As is evident from Table 8, high impact resistance that is characteristic of the resin composition of the present invention can also be obtained when the 0sp/C of the component poly(2,6-dimethyl-1,4-phenylene)ether is varied to a certain extent.

EXAMPLES 21–23

Three different resin compositions were prepared by blending 8.3 wt % of the polyorganosiloxane-based graft copolymer (S-1) (from Reference Example 1), 44.0 wt % of poly(2,6-dimethyl-1,4-phenylene)ether having an $\eta sp/C$ of 0.59 dl/g (measured in chloroform at 25°

C.), and 47.7 wt % each of different styrene copolymers shown in Table 9. Pellets and then test specimens were formed from these resin compositions by operating the above-said twin-screw extruder and injection molding machine under the same conditions as in Examples 1-6, and properties of these specimens were evaluated. Results thereof are shown in Table 9.

In Table 9, the acrylonitrile-styrene copolymer is constituted of 30 wt % of acrylonitrile and 70 wt % of styrene and has an ηsp/C of 0.61 as measured in DMF at 25° C., the methyl methacrylate-styrene copolymer is constituted of 50 wt % of methyl methacrylate and 50 wt % of styrene and has an ηsp/C of 0.54 as measured in chloroform at 25° C., and the maleic anhydride-styrene-copolymer is constituted of 30 wt % of maleic anhydride and 70 wt % of styrene and has an ηsp/C of 0.4 as measured in DMF at 25° C.

TABLE 9

| | Styrene copolymer | Izod impact strength (¼", notched, at 23° C.) (Kg · cm/cm) | Vicat softening temperature (°C.) | Melt index (5 Kg load, at 275° C.) (g/10 min.) |
|---|---|---|---|---|
| Example 21 | Acrylonitrile-styrene copolymer | 20.3 | 137 | 10.6 |
| Example 22 | Methyl methacrylate-styrene copolymer | 19.5 | 138 | 6.5 |
| Example 23 | Maleic anhydride-styrene copolymer | 21.2 | 143 | 7.2 |

Table 9 proves that resin compositions having high impact resistance can also be obtained when such different styrene copolymers are blended.

EXAMPLES 24 AND 25

Flame-retardant polyphenylene ether resin compositions were prepared and properties thereof were evaluated.

That is, a resin composition (Example 24) was prepared by blending 8.4 wt % of the polyorganosiloxane-based graft copolymer (S-1) (obtained in Reference Example 1), 56.8 wt % of the same poly(2,6-dimethyl-1,4-phenylene)ether as used in Examples 1-6, 29.5 wt % of polystyrene having a melt index of 3 g/10 min (5 Kg load at 200° C.), and 5.3 wt % of triphenyl phosphate.

Another resin composition (Example 25) was prepared by blending 8 wt % of said graft copolymer (S-1), 60 wt % of said poly(2,6-dimethyl-1,4-phenylene)ether, 22 wt % said polystyrene, and 10 wt % of triphenyl phosphate.

Pellets and then test specimens were formed from these resin compositions by operating the abovesaid twin-screw extruder and injection molding machine under the same conditions as in Examples 1-6, and preperties of these specimens were evaluated. Results thereof are shown in Table 10.

TABLE 10

| | Component content (wt. %) in resin composition | | | | Izod impact strength (¼", notched at 23° C.) (Kg · cm/cm) | Flammability (1/16" thickness) | |
|---|---|---|---|---|---|---|---|
| | Graft copolymer (S-1) | Poly(2,6-dimethyl-1,4-phenylene)-ether | Polystyrene | Triphenyl phosphate | | Average burning time (sec) | UL-94 rating |
| Example 24 | 8.4 | 56.8 | 29.5 | 5.3 | 19.3 | 12.6 | V-1 |
| Example 25 | 8 | 60 | 22 | 10 | 23.5 | 2.8 | V-0 |

Results of Examples 24 and 25 prove that resin compositions when prepared by blending the polyorganosiloxane-based graft copolymer, poly(2,6-dimethyl-1,4-phenylene)ether, polystyrene, and triphenyl phosphate in proper proportions, can be provided with such high flame retardance as to be classified by UL-94 tests (thickness of test specimen: 1/16") as V-1 or V-0.

EXAMPLES 26-28

Resin compositions reinforced with glass fiber were prepared by using the polyorganosiloxane-based graft copolymer (S-1) obtained in Reference Example 1.

That is, compositions were prepared by blending the graft copolymer (S-1), the same poly(2,6-dimethyl1,4-phenylene)ether, polystyrene having a melt index of 6 g/10 min (5 Kg load at 200° C.), and glass fiber (chopped strands RES 03 TP 68, supplied by Nippon Sheet Glass Company, Limited) in varying proportions as shown in Table 11.

According to the procedure of Examples 1-6, pellets and then test specimens were formed from these resin compositions by using the above-said twin-screw extruder and injection molding machine, and properties of these specimens were evaluated. Results thereof are shown in Table 11.

Results of Examples 26-28 prove that resin compositions having excellent mechanical strength and high heat resistance can be produced by blending poly(2,6-dimethyl-1,4-phenylene)ether with the polyorganosiloxane-based graft copolymer, polystyrene, and glass fiber.

TABLE 11

| | Component content (wt. %) in resin composition | | | | Izod compact strength (¼", notched at 23° C.) (Kg · cm/cm) | Vicat softening temperature (°C.) | Flexural property | |
|---|---|---|---|---|---|---|---|---|
| | Graft copolymer (S-1) | Poly(2,6-dimethyl-1,4-phenylene)ether | Poly styrene | Glass fiber | | | Strength (Kg/cm²) | Elastic modulus (Kg/cm²) |
| Example 26 | 6.4 | 41.6 | 32.0 | 20.0 | 6.7 | 153 | 1620 | 66,000 |
| Example 27 | 5.6 | 36.4 | 28.0 | 30.0 | 7.8 | 153 | 1720 | 76,000 |
| Example 28 | 7.2 | 46.8 | 36.0 | 10.0 | 8.9 | 152 | 1340 | 35,000 |

EXAMPLES 29-32

Flame-resistant resin compositions reinforced with glass fiber were prepared by using the polyorganosiloxane-based graft copolymer (S-1) obtained in Reference Example 1.

That is, resin compositions were prepared by blending the graft copolymer (S-1), the same poly(2,6-dimethyl-1,4-phenylene)ether as used in Examples 1-6, polystyrene having a melt index of 6 g /10 min (5 Kg load at 200° C.), triphenyl phosphate, and the same glass fiber as used in Examples 26-28 in varying proportions as shown in Table 12.

According to the procedure of Examples 1-6, pellets and then test specimens were formed from these resin compositions by using the above-said twin-screw extruder and injection molding machine, and properties of these specimens were evaluated. Results thereof are shown in Table 12.

Results of Examples 29-32 prove that resin compositions having excellent mechanical strength and high flame retardance can be produced by blending poly(2,6-dimethyl-1,4-phenylene)ether with the polyorganosiloxane-based graft copolymer, polystyrene, glass fiber, and triphenyl phosphate.

TABLE 13

| | Component content (wt. %) in resin composition | | | | | | Izod impact strength ($\frac{1}{4}''$, notched, at 23° C.) (Kg·cm/cm) | Coefficient of linear expansion ($\deg^{-1}$) | Flexural property | | Flammability (1/16" thickness) | |
|---|---|---|---|---|---|---|---|---|---|---|---|---|
| | Graft copolymer (S-1) | Poly(2,6-dimethyl-1,4-phenylene) ether | Poly styrene | Glass fiber | Carbon fiber | Triphenyl phosphate | | | Strength (Kg/cm²) | Elastic modulus (Kg/cm²) | Average burning time (sec.) | UL-94 rating |
| Example 33 | 9 | 36 | 45 | — | 10 | — | 6.2 | $3.9 \times 10^{-5}$ | 1440 | 80,000 | — | — |
| Example 34 | 8 | 32 | 40 | — | 20 | — | 5.8 | $1.2 \times 10^{-5}$ | 1480 | 142,000 | — | — |
| Example 35 | 8.5 | 34 | 42.5 | — | 10 | 5 | 7.1 | $3.7 \times 10^{-5}$ | 1430 | 83,000 | 12.2 | V-1 |
| Example 36 | 6 | 24 | 30 | 30 | 10 | — | 5.6 | $0.9 \times 10^{-5}$ | 1420 | 146,000 | — | — |
| Example 37 | 5.5 | 22 | 27.5 | 30 | 10 | 5 | 5.9 | $1.0 \times 10^{-5}$ | 1260 | 141,000 | 10.5 | V-1 |

EFFECT OF THE INVENTION

According to the present invention, it is possible to provide a polyphenylene ether resin composition superior in impact resistance, heat resistance, mechanical strength, moldability, and flow properties by blending a polyphenylene ether resin with a polystyrene resin, and a specific polyorganosiloxane-based graft copolymer defined in the present text.

TABLE 12

| | Component content (wt. %) in resin composition | | | | | Izod impact strength ($\frac{1}{4}''$, notched, at 23° C.) (Kg·cm/cm) | Flexural property | | Flammability (1/16" thickness) | |
|---|---|---|---|---|---|---|---|---|---|---|
| | Graft copolymer (S-1) | Poly(2,6-dimethyl-1,4-phenylene)ether | Poly styrene | Glass fiber | Triphenyl phosphate | | Strength (Kg/cm²) | Elastic modulus (Kg/cm²) | Average burning time (sec.) | UL-94 rating |
| Example 29 | 3.2 | 56 | 16 | 20 | 4.8 | 6.6 | 1540 | 61,000 | 5.7 | V-1 |
| Example 30 | 2.6 | 43.1 | 19.6 | 30 | 3.9 | 7.6 | 1610 | 89,000 | 13.1 | V-1 |
| Example 31 | 3.6 | 63 | 18 | 10 | 5.4 | 8.5 | 1330 | 38,000 | 8.8 | V-1 |
| Example 32 | 2.6 | 43.1 | 15.7 | 30 | 7.8 | 6.7 | 1540 | 78,000 | 3.5 | V-0 |

EXAMPLES 33-37

Resin compositions reinforced with carbon fiber were prepared by using the polyorganosiloxane-based graft copolymer (S-1) obtained in Reference Example 1.

That is, resin compositions (Examples 33 and 34) were prepared by blending the graft copolymer (S-1), the same poly(2,6-dimethyl-1,4-phenylene)ether and polystyrene as used in Examples 1-6, and carbon fiber (tradename: Pyrofil® Chopped Fiber TR 7006KA, supplied by Mitsubishi Rayon Co., Ltd.) in proportions as shown in Table 13. Further, a resin composition (Example 35) was prepared by blending triphenyl phosphate in addition to the above four ingredients, a resin composition (Example 36) by blending the same glass fiber as used in Examples 29-32 in addition to the above four ingredients, and a resin composition (Example 37) by blending triphenyl phosphate and said glass fiber in addition to the above four ingredients.

According to the procedure of Examples 1-6, pellets and then test specimens were formed from these resin compositions by using the above-said twin-screw extruder and injection molding machine, and properties of these specimens were evaluated. Results thereof are shown in Table 13.

Results of Examples 33-37 prove that resin compositions having excellent mechanical strength and high

What is claimed is:

1. A polyphenylene ether resin composition comprising a polyphenylene ether resin (A), a polystyrene resin (B), and a polyorganosiloxane-based graft copolymer (C) produced by graft polymerizing one or more vinyl monomers onto a polyorganosiloxane rubber which contains a graft-linking agent copolymerized and exhibits a degree of swelling of 3 to 15 measured in toluene.

2. The polyphenylene ether resin composition of claim 1, which is composed of 20 to 80% by weight of the polyphenylene ether resin (A), 19 to 75% by weight of the polystyrene resin (B), and 1 to 40% by weight of the polyorganosilocane-based graft copolymer (C).

3. The polyphenylene ether resin composition of claim 1, wherein the graft-linking agent is a compound which can form units represented by the formulae

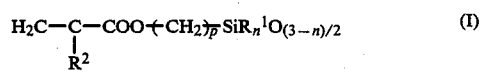

$$H_2C=C-COO-(CH_2)_p SiR^1_n O_{(3-n)/2} \quad (I)$$
$$\phantom{H_2C=}|$$
$$\phantom{H_2C=}R^2$$

wherein, $R^1$ denotes methyl, ethyl, propyl, or phenyl, $R^2$ denotes hydrogen or methyl, n denotes 0, 1, or 2, and p denotes a number of 1 to 6.

4. The polyphenylene ether resin composition of claim 1, wherein the polyorganosiloxane-based graft copolymer (C) is prepared by graft-polymerizing one or more vinyl monomers according to an emulsion polymerization method onto a polyorganosiloxane rubber prepared according to an emulsion polymerization method.

5. The polyphenylene ether resin composition of claim 4, wherein the average particle size of the polyorganosiloxane-based graft copolymer is from 0.1 to 0.5 μm.

6. The polyphenylene ether resin composition of claim 1, wherein the vinyl monomer is at least one member selected from the group consisting of aromatic alkenyl compounds and methacrylates.

7. The polyphenylene ether resin composition of claim 1, wherein the polyorganosiloxane rubber is constituted of a polyorganosiloxane which consists mainly of dimethylsilaxane units.

8. A polyphenylene ether resin composition containing a phosphoric ester flame retarder in addition to a resin composition set forth in claim 1.

9. The polyphenylene ether resin composition of claim 8, wherein the phosphoric ester flame retarder is triphenyl phosphate.

10. The polyphenylene ether resin composition of claim 8, which comprises a blend of 0.5 to 35 parts by weight of a phosphoric ester flame retarder with 100 parts by weight of the resin composition composed of 20 to 80% by weight of component (A), 19 to 75% by weight of component (B), and 1 to 40% by weight of component (C).

11. A polyphenylene ether resin composition containing glass fiber and/or carbon fiber in addition to a resin composition set forth in claim 1.

12. The polyphenylene ether resin composition of claim 11, which comprises a blend of 5 to 100 parts by weight of glass fiber and/or 5 to 50 parts by weight of carbon fiber with 100 parts by weight of the resin composition composed of 20 to 80% by weight of component (A), 19 to 75% by weight of component (B), and 1 to 40% by weight of component (C).

13. A polyphenylene ether resin composition containing a phosphoric ester flame retarder and glass fiber and/or carbon fiber in addition to a resin composition set forth in claim 1.

14. The polyphenylene ether resin composition of claim 13, wherein the phosphoric ester flame retarder is triphenyl phosphate.

15. The polyphenylene ether resin composition of claim 13, which comprises a blend of 0.5 to 35 parts by weight of a phosphoric ester flame retarder and 5 to 100 parts by weight of glass fiber and/or 5 to 50 parts by weight of carbon fiber with 100 parts by weight of the resin composition composed of 20 to 80% by weight of component (A), 19 to 75% by weight of component (B), and 1 to 40% by weight of component (C).

* * * * *